US012068718B2

(12) United States Patent
Peng

(10) Patent No.: US 12,068,718 B2
(45) Date of Patent: Aug. 20, 2024

(54) INTELLIGENT DETECTION SYSTEM

(71) Applicant: NATIONAL CHIN-YI UNIVERSITY OF TECHNOLOGY, Taichung (TW)

(72) Inventor: Cheng-Yu Peng, Taichung (TW)

(73) Assignee: NATIONAL CHIN-YI UNIVERSITY OF TECHNOLOGY, Taichung (TW)

(*) Notice: Subject to any disclaimer, the term of this patent is extended or adjusted under 35 U.S.C. 154(b) by 119 days.

(21) Appl. No.: 18/072,040

(22) Filed: Nov. 30, 2022

(65) Prior Publication Data
US 2024/0178791 A1    May 30, 2024

(51) Int. Cl.
*H02S 50/15*       (2014.01)
*G06T 7/00*        (2017.01)

(52) U.S. Cl.
CPC ............ *H02S 50/15* (2014.12); *G06T 7/0004* (2013.01); *G06T 2207/10032* (2013.01)

(58) Field of Classification Search
CPC .................. H02S 50/15; G06T 7/0004; G06T 2207/10032
USPC ..................................... 324/761.01, 537, 500
See application file for complete search history.

(56) References Cited

U.S. PATENT DOCUMENTS

| 8,233,974 B2 * | 7/2012 | Ward | A61B 5/0537 600/547 |
| 2020/0311904 A1 * | 10/2020 | Zhao | G06F 18/23 |
| 2023/0119076 A1 * | 4/2023 | Tamizhmani | H02S 50/15 348/125 |

* cited by examiner

*Primary Examiner* — Giovanni Astacio-Oquendo
(74) *Attorney, Agent, or Firm* — Birch, Stewart, Kolasch & Birch, LLP

(57) ABSTRACT

An intelligent detection system includes an image module, a target detection module, and a physical model processing module. The target detection module runs a scanning mode on the target object and controls the image module to capture target images of the target object with different physical properties under the scanning mode. The scanning mode is allowed to be based on luminescence or thermal radiation emitted by variation of time, voltage, current, or illumination. The physical model processing module receives the target images and carries out an image stacking process with each target image based on different physical properties, generating a detection result image through physical formula of electronic circuit in cooperation with a chromaticity coordinate diagram. The detection result image displays the accordingly formed image distribution, through which the physical model processing module obtains the functions, features, defect locations or identification results of defect locations of the target object.

10 Claims, 14 Drawing Sheets

INTELLIGENT DETECTION SYSTEM

BACKGROUND OF THE INVENTION

1. Field of the Invention

The present invention relates to defect detection systems, and more particularly, to an intelligent detection system for a to-be-tested object having semiconductor, electrical non-linear, and time-varying characteristics.

2. Description of the Related Art

Current construction field of solar energy systems carries out on-site detection of solar photovoltaic module usually through voltmeters and ammeters. The measured data represents the overall characteristics of the entire large-scale component, which is unable to facilitate the locating of defects. Therefore, if the data measured by the voltmeter and ammeter contains errors, a huge amount of manpower and material resources is needed to transport the defects-containing solar photovoltaic module back to the laboratory for test, so as to further detect and locate the defect position using the equipment of the laboratory. If the solar photovoltaic module has serious issues and is unable to be used anymore, the flawed solar photovoltaic module is immediately replaced with a new one. If the test result shows no major issues, the solar photovoltaic module has to be transported back to the construction site, which costs more manpower and material resources for reinstallation and restoration of the equipment.

Also, the solar photovoltaic modules during power generation process generate current flow and output through the photovoltaic conversion, which causes uneven heat distribution of the photovoltaic modules at the normal and abnormal areas thereof. Therefore, through the detection of the heating areas, the defect status of the solar photovoltaic module is allowed to be identified. The current detection method for the heating areas requires the thermal images of the solar photovoltaic modules taken by professional staff during routine on-site inspections, and the professional staff manually inspect the thermal images to examine the heating areas of modules or components. However, accurate manual judgement on the detection result remains difficult for even highly trained professional staff.

Furthermore, when a solar photovoltaic module leaves the factory, an Standard Operation Procedure (SOP) for shooting Electroluminescence (EL) images is required by the industry regulations, which is used mainly to clarify the responsibility for product shipment. Therefore, the EL images become the comparison benchmark for subsequent usage and aging comparison. Regular or random inspection arrangements are carried out at the construction site, and inspection of the EL images is often included as well. Usually, the EL images taken are only used for determining whether the solar cell is ruptured, instead of acquiring more information. The main reason is that a variety of detection information (such as cross-comparison of EL images, thermal images, etc.) are needed, and the interpretation requires professional staffs and experience databases. Also, even the field operators are well-trained, the professional interpretation capability is still difficult to be achieved.

Also, the long-term reliability and performance degradation analysis over time of the solar photovoltaic module can be carried out as well, in which a plurality of target images of the to-be-tested object are captured under the corresponding scanning mode. Therein, the scanning mode is based on time, which means that the images are captured at different time points to serve as the product history. By observing the long-term changes of the images, the characteristics of the object are accurately determined, and the defects of the object are accurately located, thereby obtaining the accurate identification results. When it is applied to test the agricultural object (such as mushrooms, etc.), scanning mode is based on time, which means that the images of the mushrooms are captured at different time points, providing the long-term reliability and performance degradation conditions over time to serve as the product history. By observing the long-term changes of the images, the growing characteristics of the mushrooms are accurately determined, and the defects of the mushroom are accurately located, wherein the location of defects may indicate the contaminant of mushrooms, such as *Penicillium* or dirt, etc.

Therefore, current detection methods of solar energy systems are only able to test simple data on site, without the capability of accurately identifying the location of defects, causing the need of huge manpower and material resources consumption to obtain accurate detection results. Also, the detection results on site still need to be manually interpreted, failing to facilitate an efficient and accurate interpretation.

SUMMARY OF THE INVENTION

To improve the issues above, an intelligent detection system is disclosed. Through the images of different physical properties, the features of the to-be-tested object and defect locations are accurately identified and determined, thereby acquiring the accurate detection results.

An intelligent detection system in accordance with an embodiment of the present invention comprises:
  an image module configured to capture an image of a to-be-tested object with different physical properties;
  a target detection module coupled with the image module and connected with the to-be-tested object, the target detection module configured to carry out a scanning mode on the to-be-tested object and control the image module to capture a plurality of target images of the to-be-tested object under the scanning mode with different physical properties, wherein the scanning mode is based on luminescence or thermal radiation emitted by variation of voltage, current, or illumination; and
  a physical model processing module coupled with the target detection module and configured to receive the target images, the physical model processing module carrying out an image stacking process with each target image based on different physical properties, and generating a detection result image through a physical formula in cooperation with a chromaticity coordinate diagram, the detection result image displaying an image distribution accordingly formed, the physical model processing module obtaining functions, features, defect locations or an identification result of defect locations of the to-be-tested object based on the detection result image.

With such configuration, the present invention accurately identifies the characteristics and defect locations of the to-be-tested object through the images with different physical properties in cooperation with the display of the chromaticity coordinate diagram and the image distribution accordingly formed, thereby accurately obtaining the accurate identification results. Therefore, the present invention improves the issue of incapability of accurately identifying the defect locations of the to-be-tested object on site, and effectively resolves the issue of inaccurate manual identification.

DETAILED DESCRIPTION OF THE INVENTION

Figure 1:
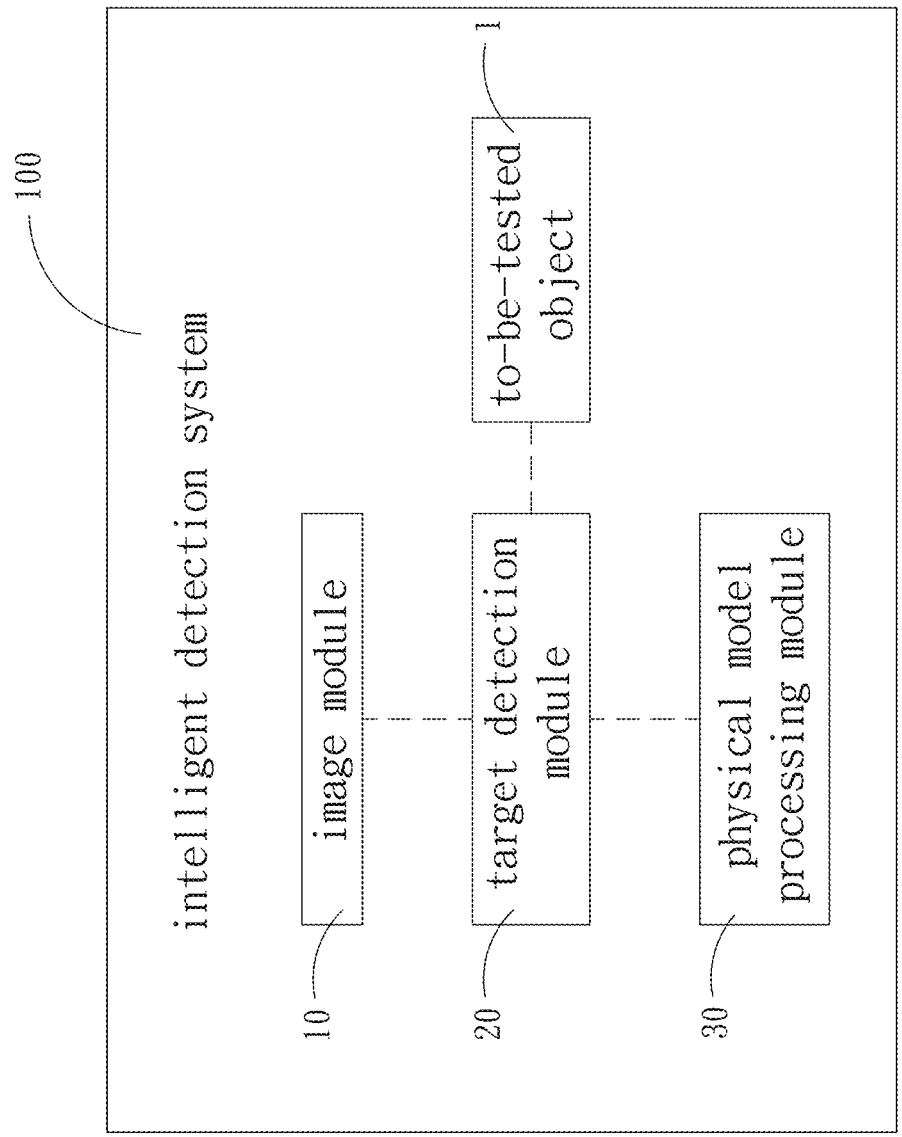
FIG. 1 is a structural block diagram of the system in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The directional terms of, for example, "up", "down", "front", "rear", "left", "right", "inner", "outer", and "side" are only used herein for illustrating the relative directions shown in the drawings. Therefore, the directional terms are applied for the purpose of illustration and understanding of the present invention, instead of limiting the present invention.

Referring to FIG. 1 to FIG. 14c, the present invention provides an intelligent detection system 100, comprising an image module 10, a target detection module 20, and a physical model processing module 30.

The image module 10 is configured to capture the image of a to-be-tested object 1 with different physical properties. The image module 10 is able to photo shoot the to-be-tested object 1 with one of the frequency spectrums including ultraviolet light, visible light, near infrared light, black body radiation heat, infrared light, microwave, and megahertz wave, so as to generate the image of the to-be-tested object 1 of different physical properties. Therein, the to-be-tested object 1 has semiconductor and electrical nonlinear characteristics. For example, the to-be-tested object 1 is a solar photovoltaic module or solar cell.

The target detection module 20 is coupled with the image module 10 and connected with the to-be-tested object 1. The target detection module 20 is configured to carry out a scanning mode on the to-be-tested object 1 and control the image module 10 to capture a plurality of target images of the to-be-tested object 1 under the scanning mode with different physical properties. Therein, the scanning mode is based on luminescence or thermal radiation emitted by variation of voltage, current, or illumination. The target detection module 20 carries out the scanning mode on the to-be-tested object 1 in a continuous or periodical manner.

For further information, when the to-be-tested object 1 has semiconductor characteristics, according to the spectral energy level physics, an external energy is needed for the semiconductor to generate the luminescence spectrum. Based on the band gap theory of semiconductors, when the to-be-tested object 1 is provided with external energy, in the excited state, the electron in the high energy is allowed to obtain an energy sufficient for it to transit from the valence band to the conduction band. After a limited time, the carrier is recombined to the lower energy state, and the electron transits from the conduction band back to the valence band to be combined with the electron hole, so as to release the energy between the conduction band and the valence band in a form of light or heat, thereby generating the luminescence image, such as the near infrared or shortwave visible light image.

Figure 2:
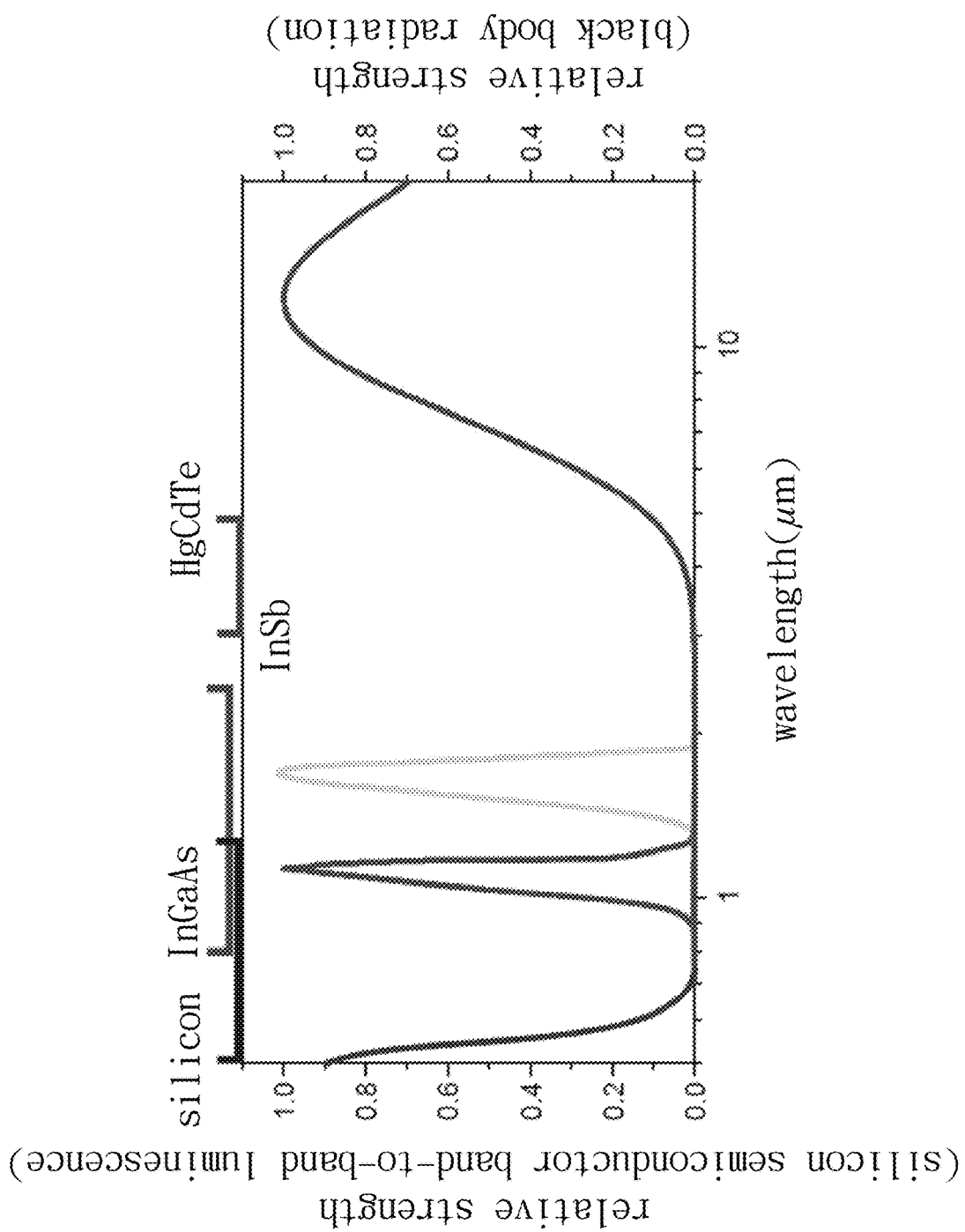
FIG. 2 is a schematic view of the excitation luminescence spectrum and the detection range of semiconductor materials in accordance with an embodiment of the present invention.
Figure 3:
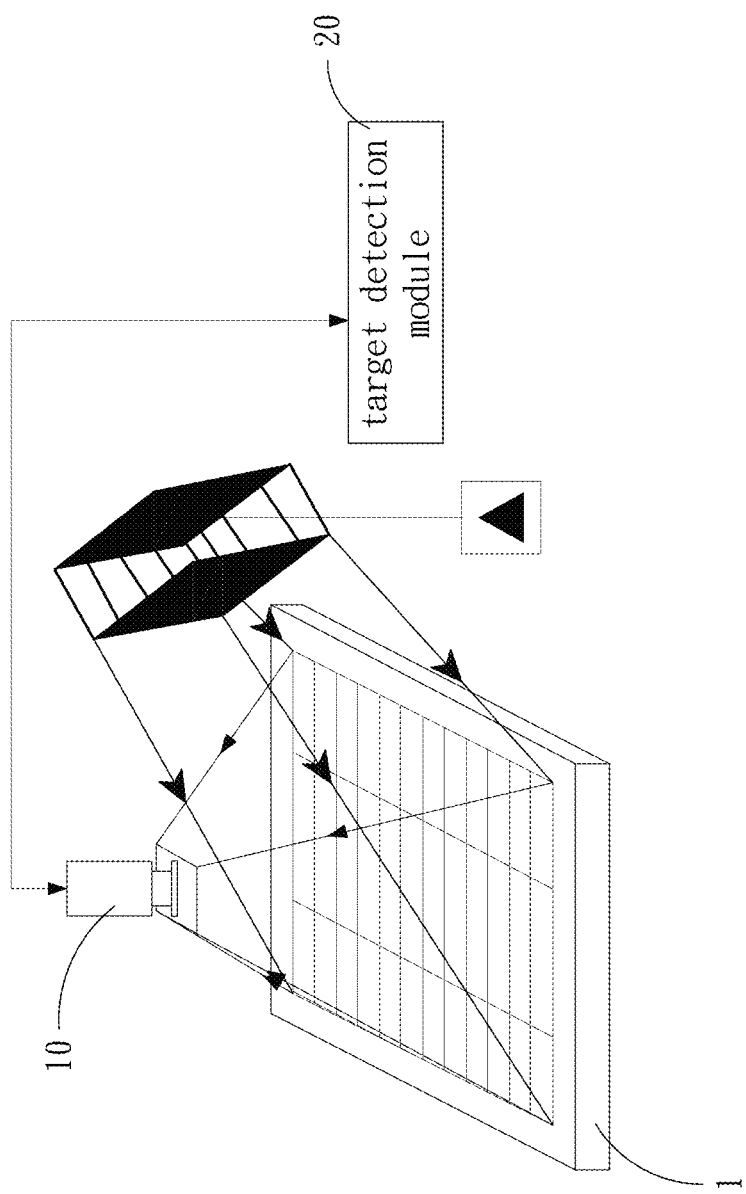
FIG. 3 is a schematic view illustrating the scanning mode of the present invention based on externally provided light illumination energy.

Referring to the spectral range of FIG. 2, when the to-be-tested object 1 is a semiconductor solar cell, the image is allowed to be an ultraviolet light image (light wavelength<400 nm), visible light image (400 nm to 800 nm), near infrared light image (1 μm to 2 μm), black body radiation thermal image (2 μm to 1 mm), and microwave image (1 mm to 1 m), etc. The excitation luminescence wavelength of the semiconductor depends on the size of the band gap. The band gap of the silicon material is approximately 1.11 eV, whose luminescence wavelength is approximately 1.15 μm. For the selection of charge coupled device (CCD) of the luminescence spectrum, semiconductor materials with different band gaps are able to be selected. Therein, the silicon material is selected for the visible light detection range. The detection spectral range of indium gallium arsenide (InGaAs) materials ranges from 0.9 μm to 1.7 μm. The indium antimonide (InSb) and mercury cadmium telluride (HgCdTe) materials are selected for the thermal radiation detection. Therefore, the indium gallium arsenide (InGaAs) material charge coupled device is selected for the luminescence spectrum of the to-be-tested object 1 which is a solar cell. The visible spectral range less than 880 nm is the junction breakdown radiation. The silicon semiconductor band-to-band luminescence (B2B) wavelength approximately ranges from 1.1 to 1.2 μm; this is the waveband of the luminescence rang of semiconductor solar cells. Also, the defect energy level through lattice dislocation states will generate a radiation recombination wavelength ranging from 1.2 to 1.6 μm; this is the waveband of the luminescence range generated by semiconductor impurities in the solar cells. The black body radiation of room temperature is mainly the range of thermal radiation; this waveband is the thermal energy conversed from the rest of the energy other than the photovoltaic conversion of solar cells. Because only the light energy in the range from 300 to 1200 nm in the solar spectrum is able to be converted into electrical energy, the energy outside the 300 to 1200 nm waveband is able to generate the heat radiation range in a thermal form.

Furthermore, the scanning mode being able to be carried out by the target detection module 20 on the to-be-tested object 1 is based on an external energy excitation, and the external energy excitation is allowed to be executed with externally provided light illumination energy or voltage energy. Therein, referring to FIG. 3, when the target detection module 20 carries out the scanning mode on the to-be-tested object 1 with external light illumination energy, a power amplifier is used to excite the laser light whose wavelength ranges from 790 to 940 nm. After adjusting the light source to be a collimated light, the laser with uniform light intensity is projected into the to-be-tested object 1 for photoluminescence (PL).

Figure 4:
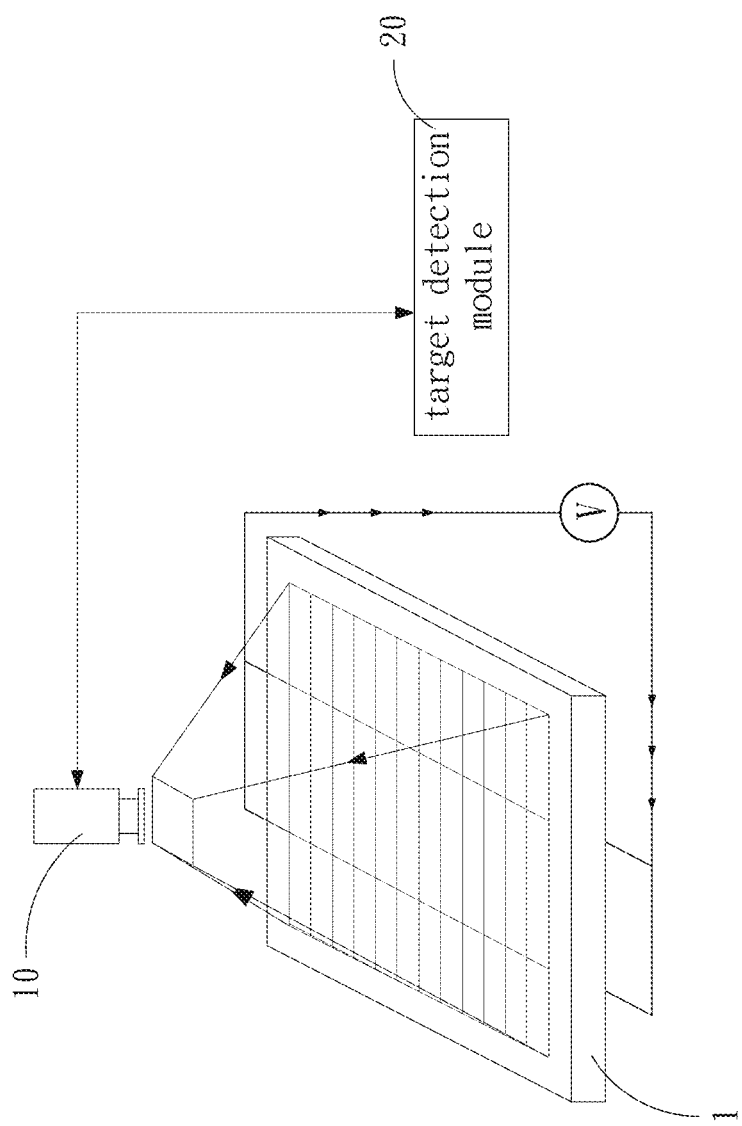
FIG. 4 is a schematic view illustrating the scanning mode of the present invention based on externally provided voltage energy.

Referring to FIG. 4, when the target detection module 20 carries out the scanning mode on the to-be-tested object 1 with external voltage energy, a power supply is used to add a forward bias voltage to excite the luminescence spectrum by electroluminescence (EL). The time for carrier recombination is called recombination lifetime. Its energy form is divided into two categories, namely non-radiative recombination and radiative recombination. In the energy transition process, the energy directly transits to the electron to continuously maintain the momentum, so that the electron directly transits from the conduction band to the valence band to emit photons, and the energy indirectly transits to electron to be combined with the electron hole to change the momentum, causing a difficulty of transition and release the most energy thermally. The photon generated by radiative recombination is the source of the luminescence spectrum. Because the to-be-tested object 1 is not a direct bandgap material, the to-be-tested object 1 has a lower radiative recombination rate, such that the to-be-tested object 1 is able to be excited by an energy higher than the bandgap.

Figures 5A, 5B, 5C, 5D:
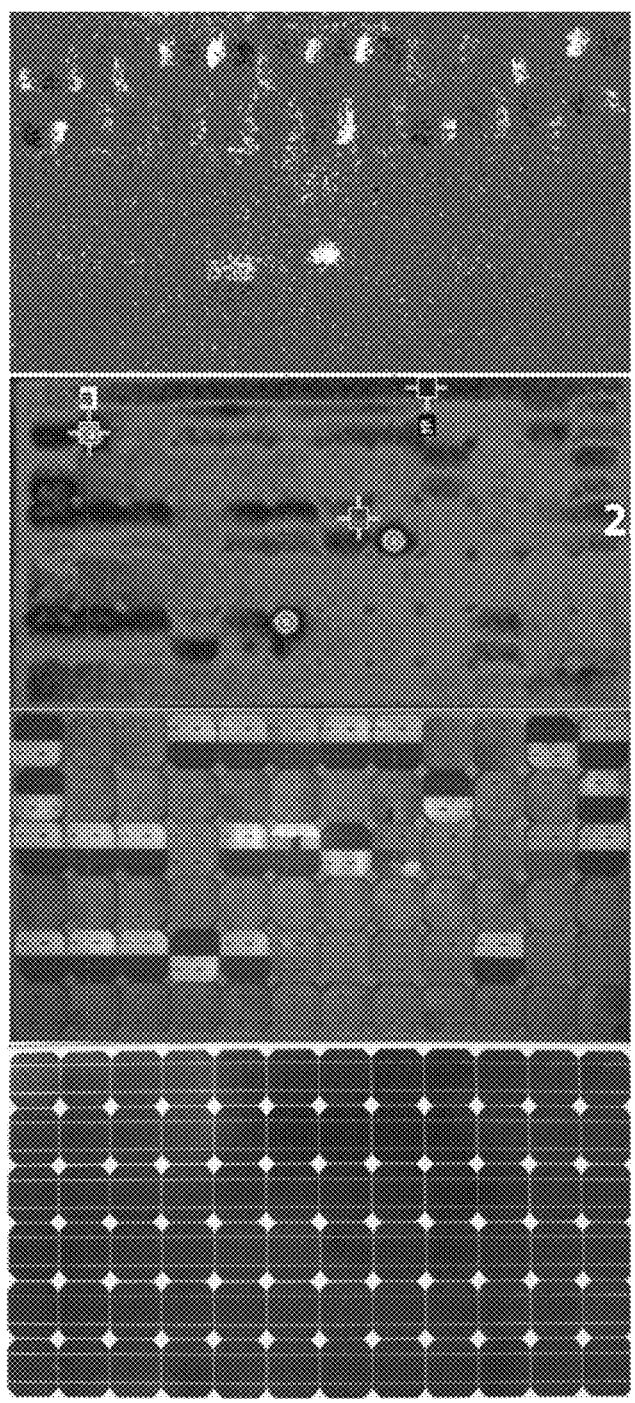
FIG. 5a is a sectional view illustrating the image generated by the image module capturing the to-be-tested object with visible light.
FIG. 5b is a sectional view illustrating the image generated by the image module capturing the to-be-tested object with near infrared light.
FIG. 5c is a sectional view illustrating the thermal image generated by the image module capturing the to-be-tested object with black body radiation.
FIG. 5d is a sectional view illustrating the thermal image generated by the image module capturing the to-be-tested object with shortwave visible light.

Referring to FIG. 5a, the target detection module 20 is configured to control the image module 10 to photo shoot the to-be-tested object 1 with the physical properties of ordinary visible light, and the image module 10 transmits the image of the to-be-tested object 1 generated by visible light.

Referring to FIG. 5b, the target detection module 20 carries out the scanning mode on the to-be-tested object 1, with an external forward voltage added to the to-be-tested object 1, such that the image module 10 photo shoots the to-be-tested object 1 with the physical properties of near infrared light. The image module 10 captures the electroluminescence (EL) image generated by the to-be-tested object 1, whereby the conduction resistance of the to-be-tested object 1 is displayed, which is suitable for observing the rupture of the to-be-tested object 1.

Referring to FIG. 5c, the target detection module 20 carries out the scanning mode on the to-be-tested object 1, with an external light illumination energy added to the to-be-tested object 1, such that rest of the energy other than those used for photovoltaic conversion is converted into thermal energy, and the image module 10 accordingly photo shoots the to-be-tested object 1 with the physical properties of black body radiation. The image module 10 captures the black body radiation thermal image generated by the to-be-tested object 1. The quality of the image accordingly generated depends on factors of the resolution and quantum efficiency of the charge coupled device of the to-be-tested object 1. For example, the to-be-tested object 1 is a solar cell. After the solar cell is irradiated by the sun, it converts the light energy into electrical energy; in other words, there will be voltage and current actions occurring on the solar cell. Different sunlight irradiation intensities cause different semiconductor characteristic variations (the rate of image variation). The thermal image is the residual energy of sunlight which is unable to be used for generating electrical energy, which is able to be displayed on the thermal imager in a thermal form. Therefore, the defect scanning and locating method with different thermal image variation rates is theoretically same as that of the defect scanning and locating process, wherein the rate of variation determines the defect locations. By capturing the image through a camera, the image variation rate is able to be obtained through the luminescence or thermal radiation emitted by the scanning mode (variation of voltage, current, and Photoluminescence (PL)). According to the variation gradient of the image generated by the scanning mode, the image areas with the larger change gradient are identified as the locations of defects.

Referring to FIG. 5d, the target detection module 20 carries out the scanning mode on the to-be-tested object 1, with an external reverse voltage added to the to-be-tested object 1, such that the image module 10 photo shoots the to-be-tested object 1 with the physical properties of short-wave visible light. The image module 10 captures the electroluminescence (EL) image generated by the to-be-tested object 1, whereby the poor PN junction contact or poor insulation areas of the to-be-tested object 1 are displayed, which is suitable for observing the leakage current of the to-be-tested object 1.

In another embodiment of the present invention, the target detection module 20 is configured to carry out an image stacking process with each target image captured under the same physical properties to generate a detection image containing the image gradient variation. The target detection module 20 analyzes the detection image to obtain the image areas with larger variation gradient, so as to identify those locations as the defect locations of the to-be-tested object 1.

Figure 6:
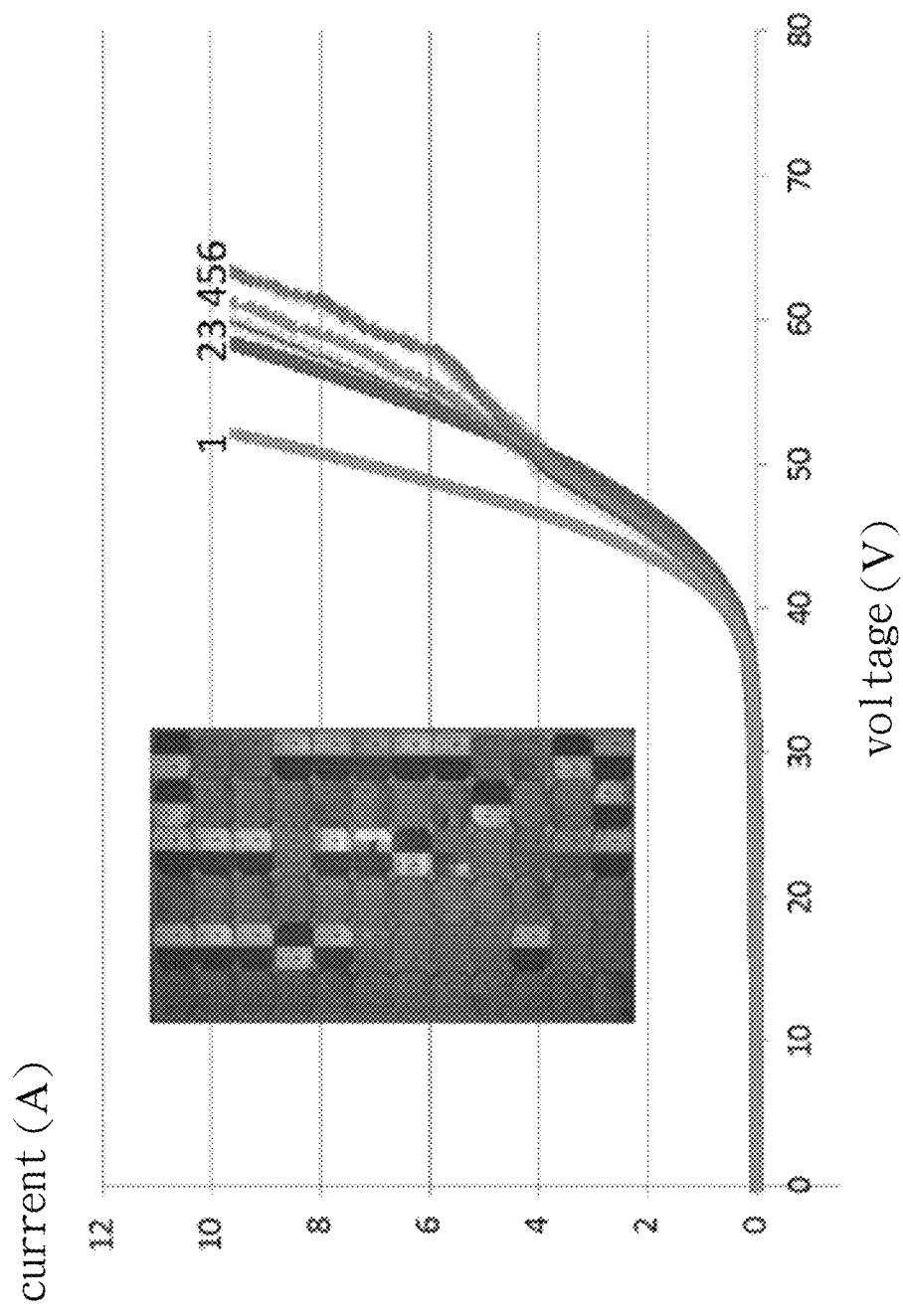
FIG. 6 is a schematic view illustrating the characteristic curve generated by the target detection module of the present invention with different forward voltages externally provided in the scanning mode.

For further information, the target detection module 20 applies the scanning mode to externally impose different voltages on the to-be-tested object 1 and controls the image module 10 to capture the images of the to-be-tested object 1 under different voltages. The target detection module 20 then carries out the image stacking process with the images generated by the to-be-tested object 1 under different voltages with the same physical property, thereby estimating the image variation rate. Referring to FIG. 6, the target detection module 20 externally imposes a plurality of forward bias voltages on the same to-be-tested object 1. The six characteristic curves in FIG. 6 represent the results of six to-be-tested objects 1. In the six characteristic curves, curve No. 1 has a larger slope indicating the more preferable semiconductor characteristics. In comparison, curve No. 5 and No. 6 have smaller slopes indicating the less preferable semiconductor characteristics. Therefore, in the displayed image, under different external voltages, the more preferable semiconductor characteristics cause a higher variation rate (larger slope), and the less preferable semiconductor characteristics cause a lower variation rate (smaller slope). Accordingly, the defect scanning and locating method of the target detection module 20 is allowed to directly detect the corresponding characteristics of the to-be-tested object 1 (solar cell in the embodiment), such as high performance, low performance, or defects of rupture, etc.

Figure 7:
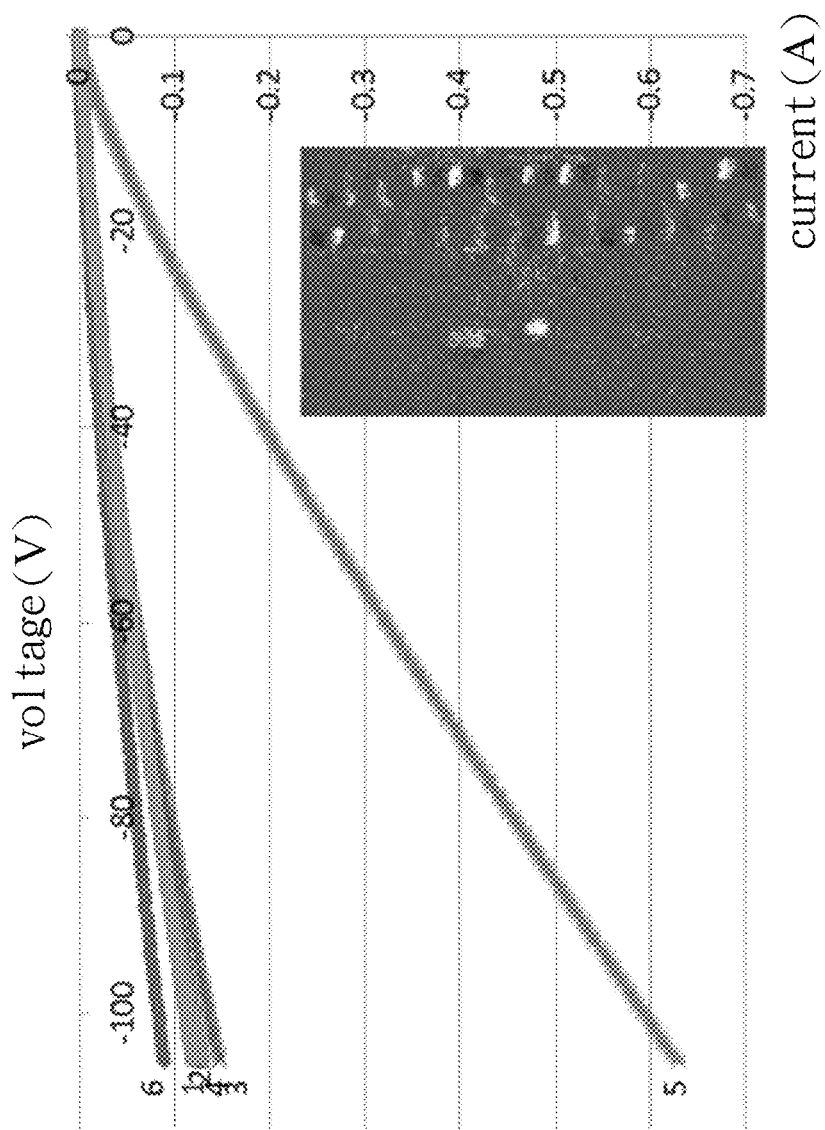
FIG. 7 is a schematic view illustrating the characteristic curve generated by the target detection module of the present invention with different reverse voltages externally provided in the scanning mode.

The aforementioned is the defect scanning and locating method carried out through obtaining the image variation rate by providing the external forward bias voltage. The same principle is allowed to be applied to the experiment with the externally provided reverse bias voltage characteristics. Referring to FIG. 7, the results of six to-be-tested objects 1 are displayed. When multiple reverse voltages vary from 0V to −110V, the EL images of each external voltage are captured (as shown in FIG. 7). Similarly, the image variation rates of multiple voltages are able to be calculated, so as to complete the defect scanning and locating process.

Figures 8A, 8B, 8C:
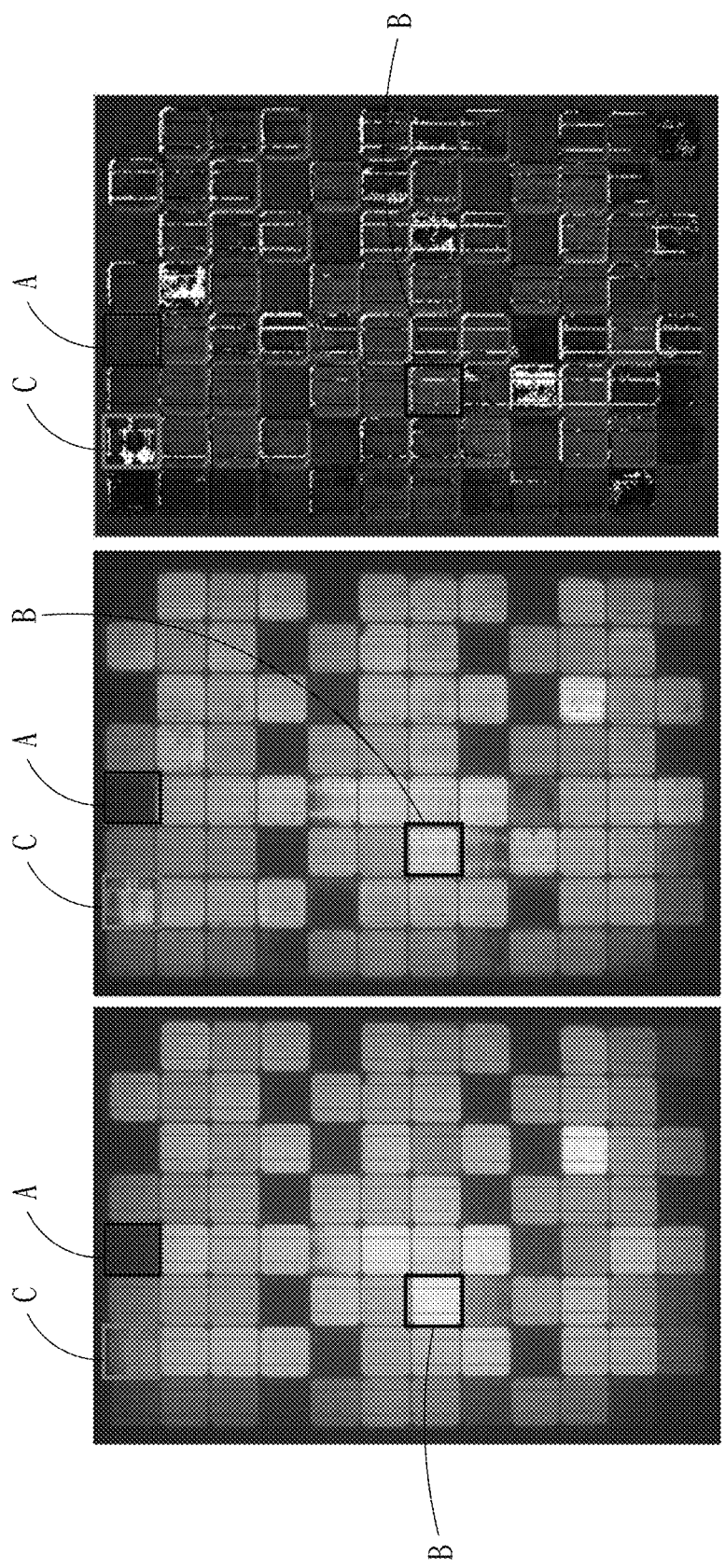
FIG. 8a is a schematic view of the image with forward voltage externally provided, illustrating the externally provided forward voltage being 58V (0.28 A).
FIG. 8b is a schematic view of the image with forward voltage externally provided, illustrating the externally provided forward voltage being 69V (2.4 A).
FIG. 8c is a schematic view illustrating FIG. 8a and FIG. 8b combined through the image stacking process.

Also, when the external forward bias voltage provided by the target detection module 20 to the same to-be-test object 1 changes from 0V to 65V, the image module 10 captures the electroluminescence images corresponding to each external voltage. When the target detection module 20 carries out the defect scanning and locating process, FIG. 8a is the EL image captured by the image module 10 under the condition of the external forward bias voltage being 58V (0.28 A); FIG. 8b is the EL image captured by the image module 10 under the condition of a larger external forward bias voltage being 69V (2.4 A); FIG. 8c is the image variation rate schematic view obtained by the target detection module 20 carrying out the image stacking process with FIG. 8b and FIG. 8a for gray level data calculation, that is, the calculation carried out with different gray levels (subtraction method in this embodiment) so as to obtain the voltage. Therefore, by the image calculation of EL images captured corresponding to different externally provided voltages, the locations having larger image variation rates are considered for defect scanning and locating. The location descriptions in FIG. 8a to FIG. 8c are as follows: (1) Location point A represents a change of multiple voltages, but with only a very subtle variation rate in the gray level of the image, which is regarded as a poor PN junction performance (low performance area). (2) Location point B represents a change of multiple voltages with a uniform and proportional variation rate in the gray level of the image, which is regarded as a good PN junction performance (high performance area). (3) Location point C represents a change of multiple voltages, with high variation rate and low variation rate at the same time in the gray level of the image, so that a uniform image should be presented on the to-be-tested object 1 (the same solar cell in this embodiment). However, the difference between the variation rate possibly indicates the rupture of cell. Therefore, it is considered that the PN junction is partially ruptured and partially intact (rupture defect area).

The physical model processing module 30 is coupled with the target detection module 20 and configured to receive each target image. The physical model processing module 30 carries out an image stacking process with the target images of different physical properties and generates a detection result image through a physical formula in cooperation with a chromaticity coordinate diagram. The detection result image displays the accordingly formed image distribution. The physical model processing module 30 obtains the functions, features, defect locations or the identification results of defect locations of the to-be-tested object 1 through the detection result image. Therein, the physical model processing module 30 is able to perform the process of image stacking, de-noising, segmentation, feature enhancement, feature extraction, and identification analysis or a combination thereof on each target image.

Figure 9:
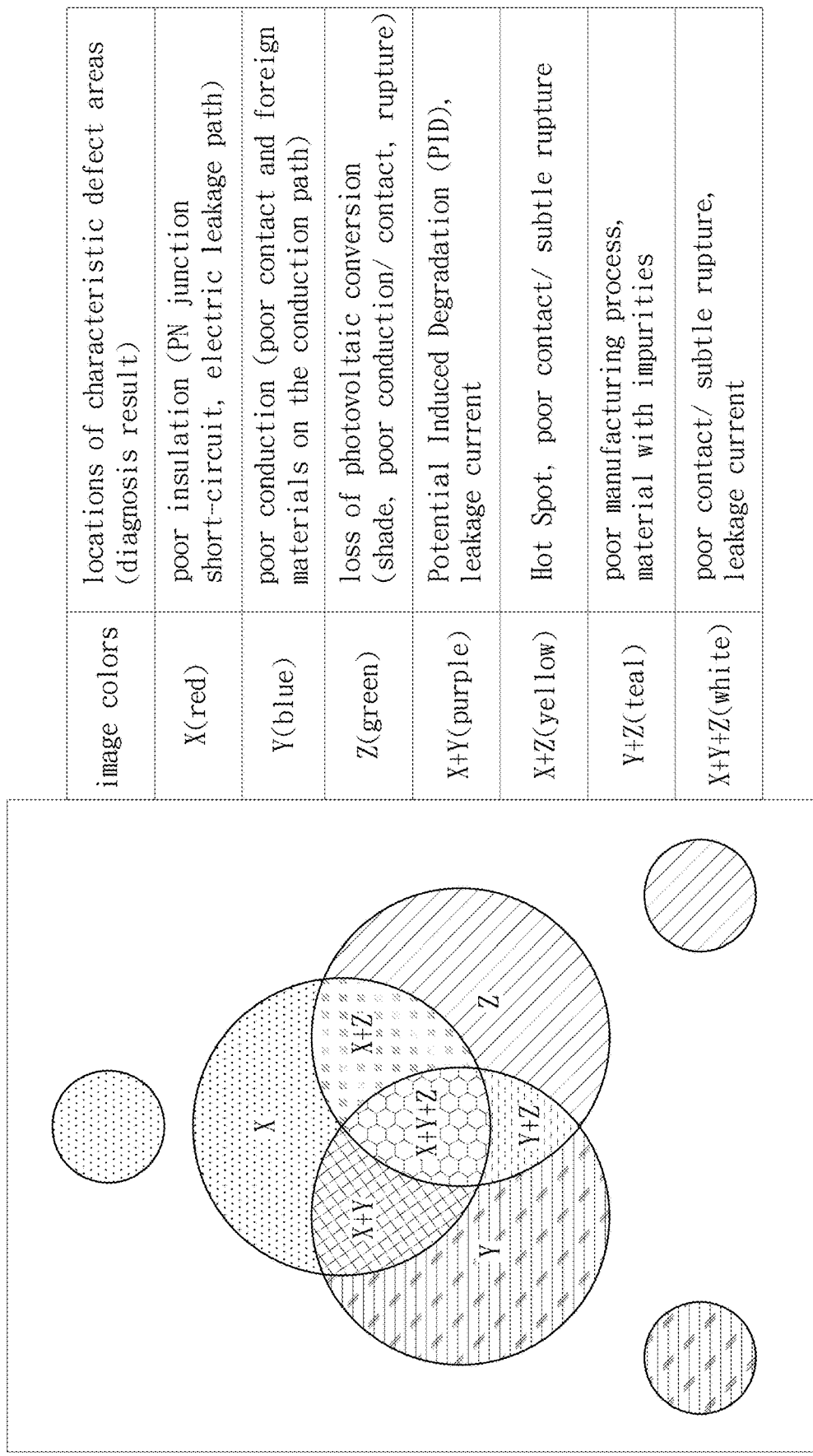
FIG. 9 is a chromaticity coordinate diagram of the present invention, illustrating the locations of characteristic defect areas and the defects diagnosis.

For further information, the image integration defect analysis process of the physical model processing module 30 sequentially includes image conversion, image form processing, feature identification, feature analysis calculation, and quantitative evaluation calculation. The accuracy of defect identification depends on the factors of image correction, numerical normalization, binarization, image recognition, and charge couple device quantum efficiency. After the sensitive image signals are captured, the luminescence image is allowed to be used for regional defects identification, so as to define the fault characteristics and establish the measured database diagnosis. Referring to FIG. 9, the result has integrated the characteristics of variable voltage and the physical model processing unit of the chromaticity coordinates, so as to carry out the identification of monitoring and diagnosis result.

Further, the physical formula is a circuit model formed of electronic components. The circuit model represents different physical properties according to characteristics of different electronic components. The circuit model is allowed to be an energy level physical model, an electromagnetic physical model, a thermodynamic physical model, or a physical behavior model. Therein, the physical formula is an equivalent diode circuit or a semiconductor energy level diagram. In the embodiment of the present invention, the physical formula is an equivalent diode circuit.

The chromaticity coordinate diagram comprises a three-dimensional basis. The three-dimensional basis of the chromaticity coordinate diagram is allowed to be divided into three different physical property p parameters. The three-dimensional basis of the chromaticity coordinate diagram displays three different property parameters with the chromaticity coordinates to identify the features, the defect locations, or the identification results of the defect locations of the to-be-tested object 1. Alternatively, the three different property parameters are allowed to be first adjusted with different weights, then marked on the chromaticity coordinates, and used to obtain the functions of the to-be-tested object 1 according to different weights thereof. Therein, the coordinates of the chromaticity coordinate diagram define the color space through a mathematical mode, and the color space image processing method of the chromaticity coordinate diagram is allowed to be CIE XYZ, CIE RGB, YIQ, HSV, YUV, CMY, or HSI.

Figure 10:
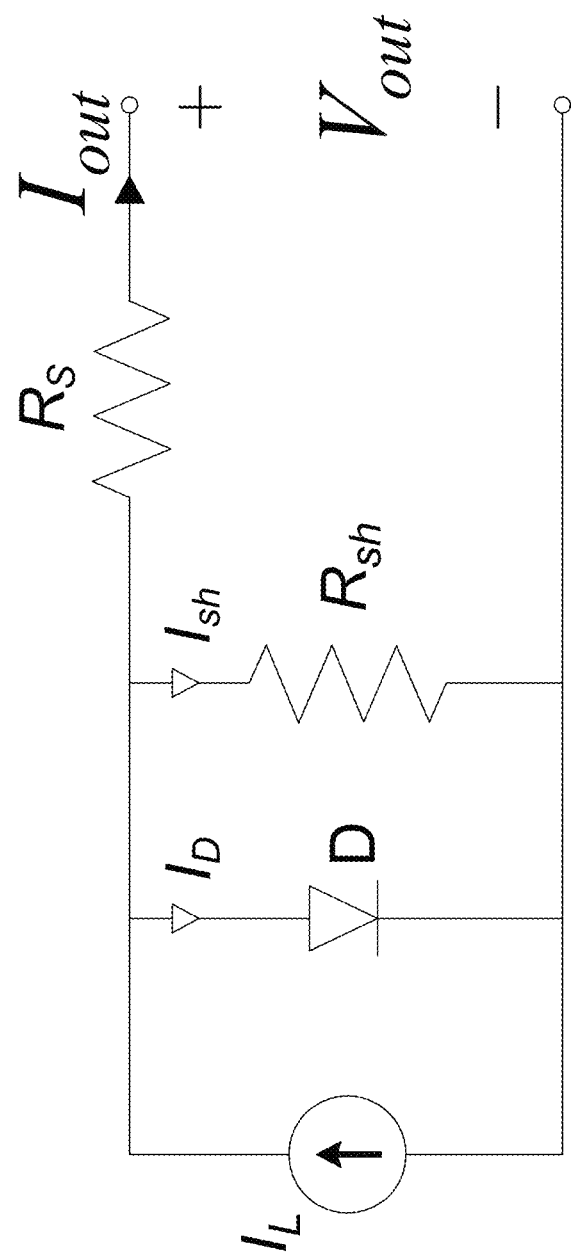
FIG. 10 is a schematic view of the circuit model of the equivalent diode in accordance with an embodiment of the present invention.

Referring to FIG. 10, the physical formula is an equivalent diode circuit. The series resistance (Rs) represents the resistance on the circuit. The forward bias voltage EL image is able to represent the conductivity characteristics/resistance of different image areas. The parallel resistance (Rsh) and the diode characteristics (D) represent the short-circuit characteristics on the circuit. The reverse bias voltage EL image is able to represent the leakage current or short-circuit insulation characteristics of different image areas. The current source (IL) represents the characteristics of the external energy input on the circuit. The solar spectrum energy is able to be converted into electrical energy and thermal energy, so the thermal image represents the loss of light energy converted into electrical energy on different image areas and the loss of unutilized spectrum. In other words, the thermal image represents the current source (IL) component. Vout and Iout are the common output characteristics of these three images (forward bias EL image, reverse bias EL image, thermal image). Those common output characteristics are displayed with image colors through the chromaticity coordinate diagram, showing the defect diagnosis characteristics of different regions (localized) in the image space.

Figure 11:
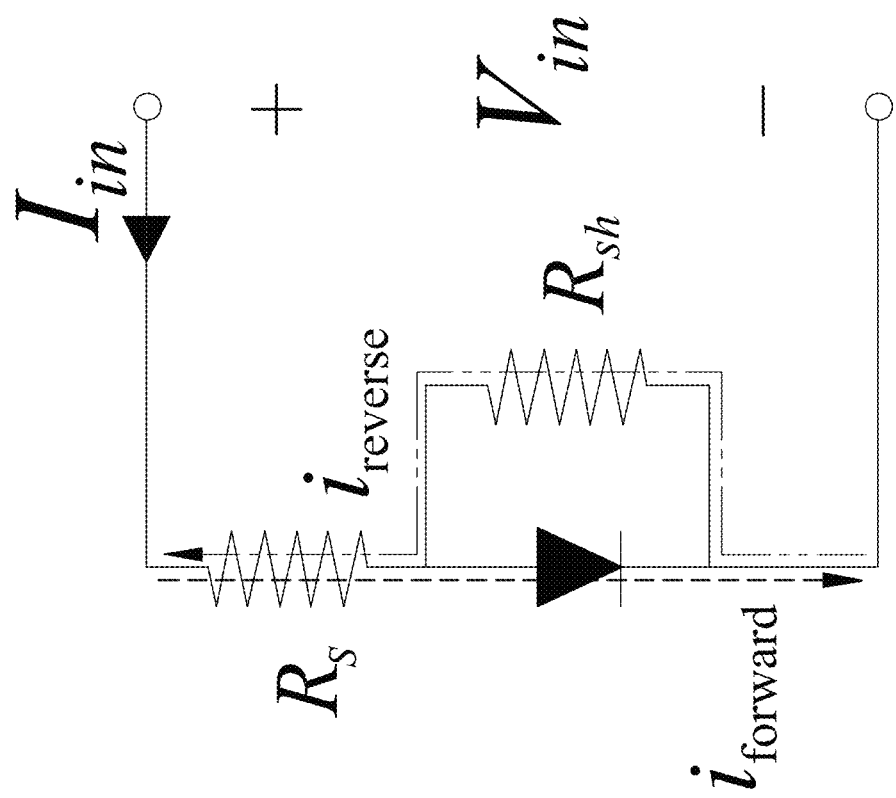
FIG. 11 is a schematic view illustrating the circuit model formed by the physical model processing module with electronic components in accordance with an embodiment of the present invention.

Referring to FIG. 11, the physical model processing module 30 uses a circuit model formed of electronic components to illustrate the measurement method of the externally provided voltage corresponding to the circuit components. Therein, the terminal of the externally provided power source is at the Vin end. (1) When the terminals (+) and (−) are respectively connected to the positive and negative poles of the power supply, the voltage is a forward bias voltage, and the forward bias voltage path only passes through the circuit components of the series resistance (Rs) and the diode (D). Therefore, the current of the forward bias voltage takes the path of the diode (D) having the smaller resistance, and the accordingly measured EL image only corresponds to the circuit components of the series resistance (Rs) and the diode (D). Normally, the internal resistance value of the diode (D) is over 100 times smaller than the series resistance (Rs) value, so the internal resistance of the diode (D) is allowed to be ignored; that is, the forward bias voltage EL image represents the series resistance (Rs) components. (2) When the terminals (+) and (−) are respectively connected to the negative and positive poles of the power supply, the voltage in this reverse connection is the reverse bias voltage, and the reverse bias voltage path only passes through the circuit components of the parallel resistance (Rsh). Therefore, the current of the reverse bias voltage takes the path of the series resistance (Rs) and the parallel resistance (Rsh), and the accordingly measured EL image only corresponds to the circuit components of the series resistance (Rs) and the parallel resistance (Rsh). Normally, the parallel resistance (Rsh) value is over 100 times larger than the series resistance (Rs) value, so the series resistance (Rs) is allowed to be ignored; that is, the reverse bias voltage EL image represents the parallel resistance (Rsh) components.

Figure 12:
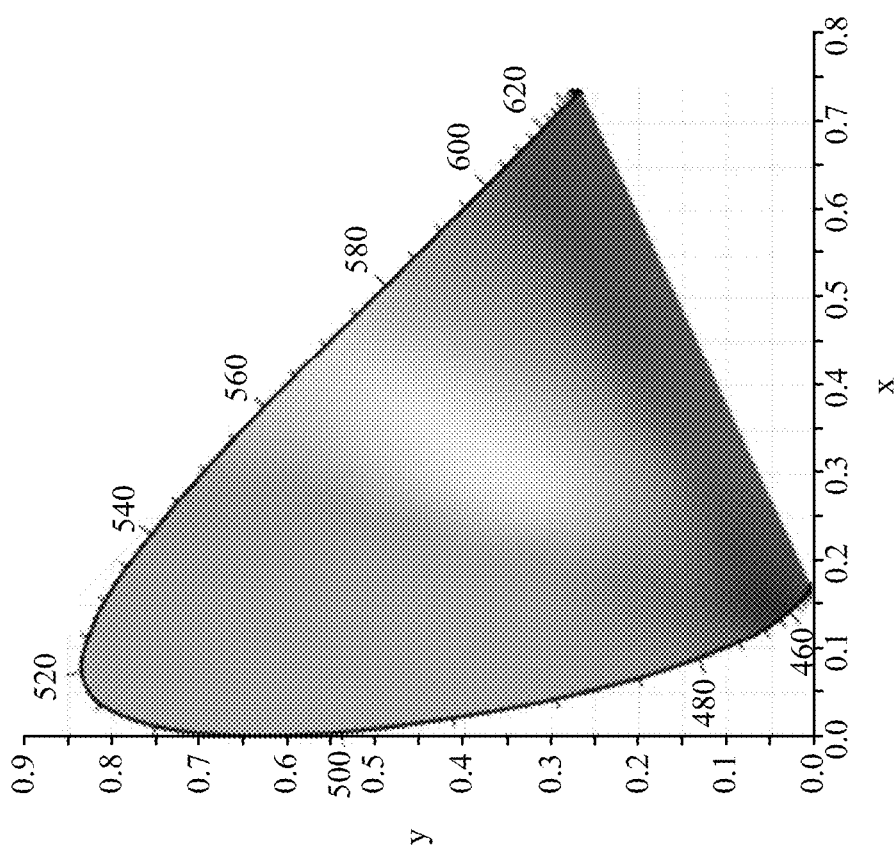
FIG. 12 is a schematic view illustrating the coordinates of the chromaticity coordinate diagram.

The physical model processing module 30 carries out the image stacking process with the target images of different physical properties (forward bias voltage EL image, reverse bias voltage EL image, thermal image), and integrates the common output characteristics of the chromaticity coordinate diagram through the physical formula. Referring to FIG. 12, the common output characteristics are marked with colors to be displayed through the coordinates on the chromaticity coordinate diagram, thereby displaying the defect diagnosis characteristics of different areas (localized) in the image space. In FIG. 12, the red, blue, and green three-dimensional basis displays three different property parameters through the chromaticity coordinate diagram to identify the common output of series resistance (forward), parallel resistance (reverse) and photocurrent, thereby obtaining the results of features or defects thereof. Alternatively, the three different property parameters (series resistance (forward), parallel resistance (reverse), photocurrent) are allowed to be adjusted with different weights first, and then marked on the chromaticity coordinate diagram, such that the weights are used to intelligently generate the functions of the detection target and display in the area location of the image.

Notably, the physical model processing module 30 applies the international test standard IEC61215 as the reference standard and uses the three-dimensional basis which are divided into three different physical property parameters. The three-dimensional basis displays the three different property parameters through the chromaticity coordinate diagram for identifying the results, and the results are the features or defects of the target. Also, the three different property parameters are able to be adjusted with different weights respectively, and then marked on the chromaticity coordinate diagram, such that the weights are used for intelligently generating the functions of the detection target. The adjustment of the weights is carried out by adopting the training data design of neural network.

The three different property parameters are able to be adjusted with different weights respectively, and then marked on the chromaticity coordinate diagram for display, and further integrated into artificial intelligence or expert systems for data interpretation. In initially proposition, there are four inputs, three outputs, and one hidden layer. The hidden layer comprises four neurons. The physical model processing is carried out through the equivalent diode modeling method and the chromaticity coordinate diagram display. By relating the function design of the condition monitoring and diagnosis system of the solar photovoltaic module and the mathematical model, based on the database of the ex-factory history, routine tests, and long-term reliability of the product, the relationship between common defects and faults of solar cell modules and their quality are allowed to be researched and discussed. The key parameters selected for physical model processing is allowed to be extended to the conduction resistance, insulation resistance, or wet and leakage resistance of the solar module strings after passing the IEC61215 standard test. Regarding the establish of the database, the maximum power attenuation ratio of the solar cell module and the attenuation ratio of the luminescence image quantitative index before and after the test are able to be adopted, so as to finally divide the evaluation into multi-level or three-level (A, B, C) evaluation. Then, learning and training are carried out according to the collected data, facilitating the research on the correction of the prediction accuracy and the setting parameters, thereby achieving the functions of status monitoring and diagnosis through the intelligent detection system 100 of the present invention.

Figure 13B:
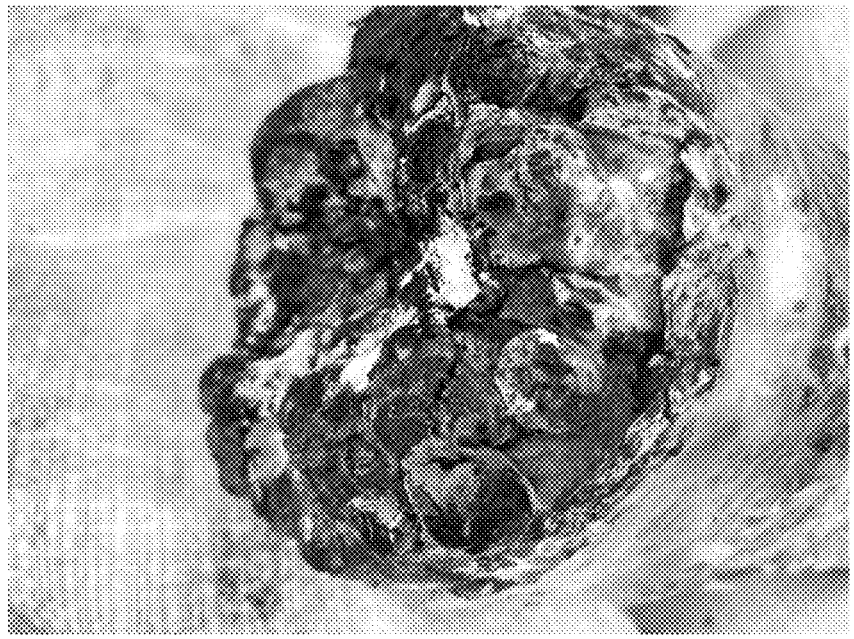
FIG. 13b is a schematic image of *Agaricus subrufescens* with mold contamination.
Figure 13A:
FIG. 13a is a schematic image of *Agaricus subrufescens* normally grown without contamination of mold.

Taking *Agaricus subrufescens* as an example, the *Agaricus subrufescens* often suffers from artificial or environmental contamination, so as to be infected by mold (*Penicillium*). Referring to FIG. 13a and FIG. 13b, FIG. 13a shows a normal *Agaricus subrufescens* (without mold contamination), and FIG. 13b shows a contaminated *Agaricus subrufescens* (*Penicillium* on the green areas). The scanning mode is carried out based on time, that is, a plurality of target images is captured at different time points. The pictures of the *Agaricus subrufescens* of FIG. 13*a* and FIG. 13*b* are taken with a 5-day interval, serving as the product history for observing the long-term variation of the image, thereby accurately identifying the *Penicillium* features and defect locations of the to-be-tested object 1 (*Agaricus subrufescens*), obtaining an accurate identification result.

Figure 14C:
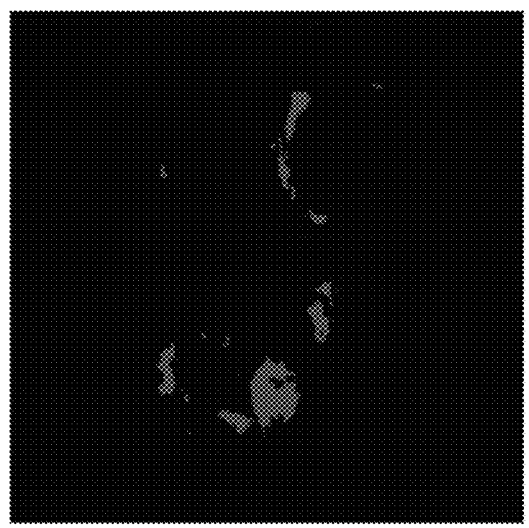
FIG. 14c is a chromaticity coordinate diagram of the *Agaricus subrufescens* test, wherein the physical property is the areas indicating serious *Penicillium* contamination.
Figure 14B:
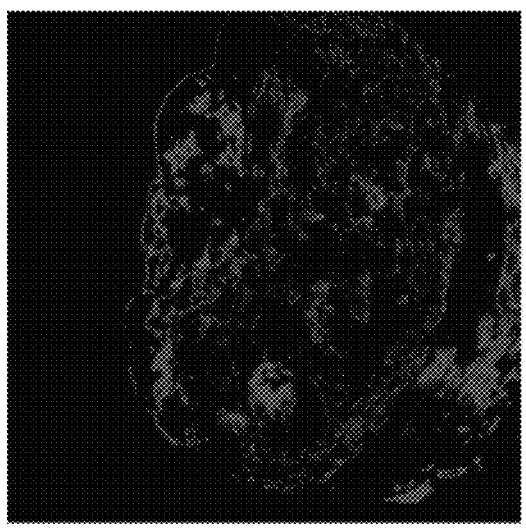
FIG. 14b is a chromaticity coordinate diagram of the *Agaricus subrufescens* test, wherein the physical property is the brown-colored growing areas indicating continuous growth.
Figure 14A:
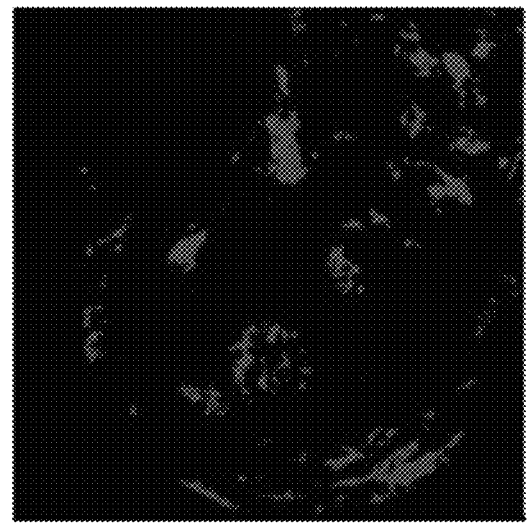
FIG. 14a is a chromaticity coordinate diagram of the *Agaricus subrufescens* test, wherein the physical property is an abnormal color occurring areas indicating different substance.

Referring to FIG. 14*a* to FIG. 14*c*, the to-be-tested object 1 (*Agaricus subrufescens*) varies with time; the image processing algorithm of color threshold HSV is used to compare the images before (FIG. 13*a*) and after (FIG. 13*b*), so as to obtain the areas having a larger thermal image variation gradient (FIG. 14*a*), thereby displaying the occurring areas of abnormal colors indicating the physical properties of different substances. The to-be-tested object 1 (*Agaricus subrufescens*) varies with time; the visible light image processing algorithm of color threshold RGB is used to compare the images before (FIG. 13*a*) and after (FIG. 13*b*), so as to obtain the areas having a larger image variation gradient (FIG. 14*b*), thereby displaying the brown-colored areas indicating the physical properties of a continuous growth. The to-be-tested object 1 (*Agaricus subrufescens*) varies with time; the visible light image processing algorithm of color location is used to compare the images before (FIG. 13*a*) and after (FIG. 13*b*), so as to obtain the areas having a larger image variation gradient (FIG. 14*c*), thereby displaying the areas indicating the physical properties of serios *Penicillium* contamination. The physical model processing module 30 carries out the image stacking process with the target images of different physical properties, and the three-dimensional basis displays the three different property parameters on the chromaticity coordinate diagram to identify the results representing the characteristics (or defects) of the to-be-tested object 1. Then, learning and training are carried out according to the collected data, facilitating the research on the correction of the prediction accuracy and the setting parameters, thereby achieving the functions of status monitoring and diagnosis through the intelligent detection system 100 of the present invention.

With the foregoing configuration, the intelligent detection system 100 of the present invention accurately identifies the features and defect locations of the to-be-tested object 1 through the images of different physical properties in cooperation with the display of chromaticity coordinate diagram and the accordingly formed image distribution, thereby obtaining the accurate identification results.

Although particular embodiments of the present invention have been described in detail for purposes of illustration, various modifications and enhancements may be made without departing from the spirit and scope of the invention. Accordingly, the invention is not to be limited except as by the appended claims.

What is claimed is:

1. An intelligent detection system, comprising:
   an image module configured to capture an image of a to-be-tested object with different physical properties;
   a target detection module coupled with the image module and connected with the to-be-tested object, the target detection module configured to carry out a scanning mode on the to-be-tested object and control the image module to capture a plurality of target images of the to-be-tested object under the scanning mode with different physical properties, wherein the scanning mode is based on luminescence or thermal radiation emitted by variation of time, voltage, current, or illumination; and a physical model processing module coupled with the target detection module and configured to receive the target images, the physical model processing module carrying out an image stacking process with the target images based on different physical properties, and generating a detection result image through a physical formula in cooperation with a chromaticity coordinate diagram, the detection result image displaying an image distribution accordingly formed, the physical model processing module obtaining functions, features, defect locations or an identification result of defect locations of the to-be-tested object based on the detection result image.

2. The intelligent detection system of claim 1, wherein the target detection module is configured to carry out the image stacking process with the target images captured under an identical physical property, so as to generate a detection image with image gradient variation; the target detection module obtains an image area having larger variation gradient through the detection image analysis and identifies the image area as a defect location of the to-be-tested object.

3. The intelligent detection system of claim 1, wherein the image module is configured to photo shoot the to-be-tested object with one frequency spectrum selected from a group consisting of ultraviolet light, visible light, near infrared light, black body radiation heat, infrared light, microwave, and megahertz wave, so as to generate the image of the to-be-tested object 1 of different physical properties.

4. The intelligent detection system of claim 3, wherein the physical model processing module is configured to perform a process selected from a group consisting of image stacking, de-noising, segmentation, feature enhancement, feature extraction, identification analysis, and a combination thereof on each target image.

5. The intelligent detection system of claim 3, wherein the to-be-tested object has semiconductor, electrical nonlinear, or varying with time characteristics.

6. The intelligent detection system of claim 3, wherein the target detection module continuously or periodically carries out the scanning mode on the to-be-tested object.

7. The intelligent detection system of claim 1, wherein the physical formula is a circuit model formed of electronic components; the circuit model represents different physical properties according to characteristics of different electronic components; the circuit model is allowed to be an energy level physical model, electromagnetic physical model, thermodynamic physical model, or physical behavior model.

8. The intelligent detection system of claim 7, wherein the physical formula is an equivalent diode circuit or a semiconductor energy level diagram.

9. The intelligent detection system of claim 1, wherein the chromaticity coordinate diagram comprises a three-dimensional basis; the three-dimensional basis of the chromaticity coordinate diagram is configured to be divided into three different physical property parameters; the three-dimensional basis of the chromaticity coordinate diagram uses chromaticity coordinates of three different property parameters to identify the features, the defect locations, or the identification results of the defect locations of the to-be-tested object; alternatively, the three different property parameters are adjusted with different weights, and then marked on the chromaticity coordinates, so as to obtain the functions of the to-be-tested object according to different weights thereof.

10. The intelligent detection system of claim 9, wherein the coordinates of the chromaticity coordinate diagram define a color space through a mathematical mode, and an image processing method of the color space of the chromaticity coordinate diagram is selected from a group consisting of CIE XYZ, CIE RGB, YIQ, HSV, YUV, CMY, and HSI.

\* \* \* \* \*